INVENTOR.
ALBERT REYNOLDS MORSE
BY Fay & Fay
ATTORNEYS

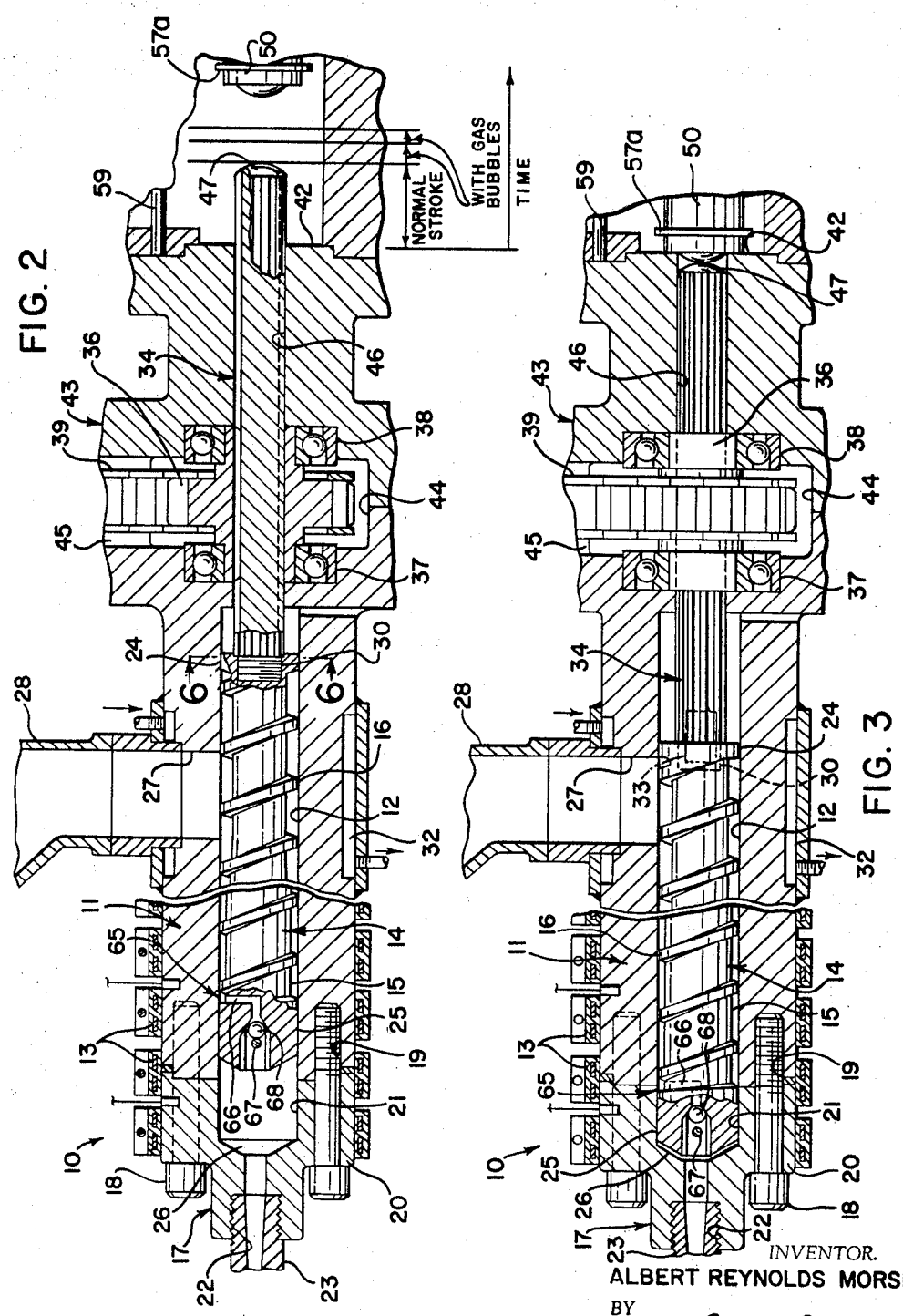

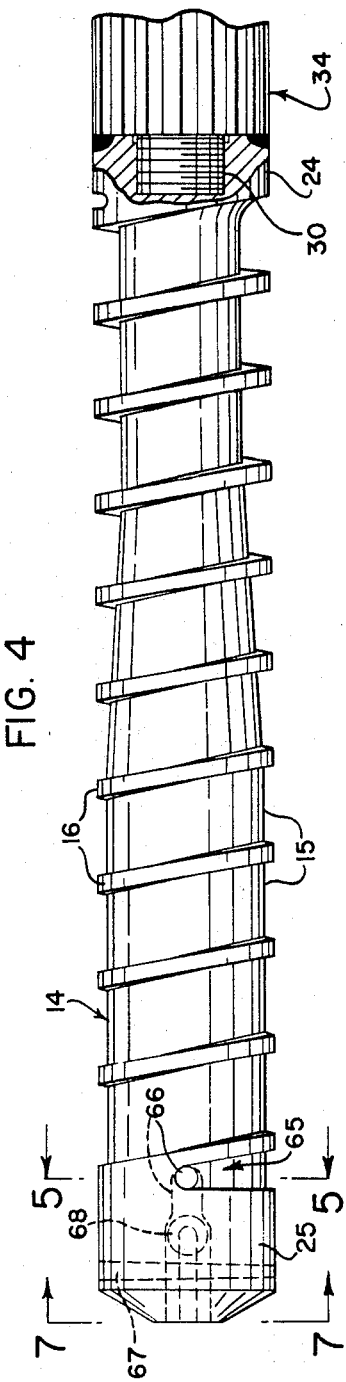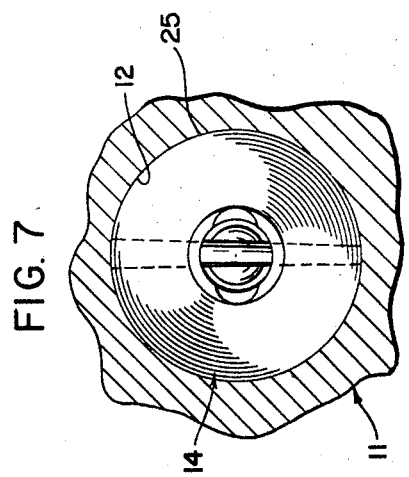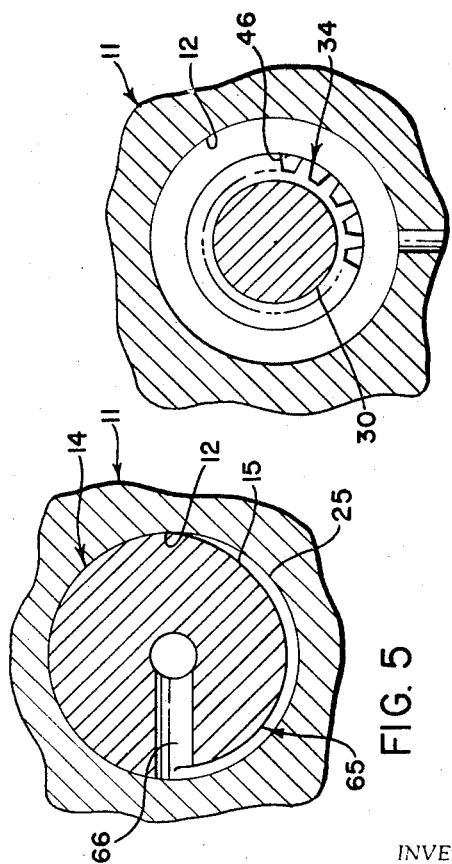

Feb. 4, 1969 A. R. MORSE 3,425,096
RECIPROCABLE SCREW INJECTION MOLDING DEVICE
Filed Dec. 8, 1966 Sheet 4 of 4

INVENTOR.
ALBERT REYNOLDS MORSE
BY Fay & Fay
ATTORNEYS

United States Patent Office
3,425,096
Patented Feb. 4, 1969

3,425,096
RECIPROCABLE SCREW INJECTION MOLDING DEVICE
Albert Reynolds Morse, Beachwood, Ohio, assignor to IMS Company, Cleveland, Ohio, a corporation of Ohio
Continuation-in-part of application Ser. No. 442,632, Mar. 25, 1965, which in turn is a continuation-in-part of application Ser. No. 275,013, Apr. 23, 1963 and application Ser. No. 284,243, May 29, 1963, now Patent No. 3,267,524, which in turn is a continuation-in-part of application Ser. No. 232,201, Oct. 22, 1962, now Patent No. 3,246,367. This application Dec. 8, 1966, Ser. No. 600,168
U.S. Cl. 18—30          6 Claims
Int. Cl. B29f 1/06, 1/08

ABSTRACT OF THE DISCLOSURE

This disclosure relates to a plastic injection molding device in which the screw ram has in fluid communication a convergence defined by the terminal portions of the flight walls and a discharge opening in the center of the tip of the screw. The screw tip discharge opening may have a ball check valve to prevent back flow. The screw ram includes a cylindrical bearing adjacent its end to maintain alignment and is moved forward by a first independent hydraulic drive means but returns freely in response to forces built up by an increase in plastic being fed in front of the tip by a constant number of rotations from a second rotational drive means thus permitting a substantially constant change regardless of material variations in density and gas content.

---

This application is a continuation-in-part of application Ser. No. 442,632, filed Mar. 25, 1965, now abandoned, which in turn is a continuation-in-part of application Ser. No. 275,013, filed Apr. 23, 1963, now abandoned, and application Ser. No. 284,243, filed May 29, 1963, now U. S. Patent No. 3,267,524 which is a continuation-in-part of application Ser. No. 232,201, filed Oct. 22, 1962, now U.S. Patent No. 3,246,367.

This invention concerns a segmented injection plasticizing unit for use in plastic injection molding and is adapted particularly for use in either temporarily or permanently converting conventional injection molding machines for more efficient injection molding of thermoplastic materials such as, for example, polyolefins, styrenes, nylons, acrylics, cellulosics, polycarbonates, vinyls, and acetals.

The invention may also be utilized so as to provide a new type of injection molding machine which will minimize the space requirements of such a machine and accomplish the injection molding operation in a more efficient manner by either screw or plunger interchangeably.

Broadly, the invention contemplates a segmented injection and plasticizing unit for use in plastic injection molding which includes a heated elongated housing means having an axial bore and an end structure with a discharge opening for connection to a mold or the like. A floating self-aligning screw is mounted in the bore for accurately timed rotation and reciprocation and defines with the bore a tortuous helical passage in communication with the discharge opening. A lateral passage is provided such that it has one end in communication with the tortuous passage and the other end in communication with a material source. The material source is generally a reservoir for granular plastic material.

An intermittently rotationally driven member in the form of a spline, for example, is mounted for reciprocation with the screw and is joined to the screw for imparting rotation from the driven member to the screw by means of a slip or overload clutch or a frangible link such as a key or shear pin of a material having a low shear strength relative to the strength of the screw and driven member. The link provided between the two members may be such that it is capable of axial movement relative to at least one of the members to facilitate removal of the screw for cleaning or repairing when the end structure is removed from the housing means. An intermittently actuated plunger member, which is rotationally independent of the spline member, is positioned in axial force transmitting relationship to the spline member for driving it toward the discharge opening against the screw to thereby force material in the passage and bore past the ball shutoff or non-return valve through the discharge opening into an injection mold.

Initially, the segmented injection device is such that granular plastic material is placed in the reservoir and the three segments, namely, the screw, the spline, and the plunger are located at the respective limits of their movement in the direction away from the discharge opening. The bore and tortuous helical passage and the lateral passage from the material reservoir are all filled with the material by an initial priming operation which may be easily performed by mere selective driving of the spline member and rotation of the screw. Once primed with plastic, alternate operations of charging and injecting continue for as long as the machine continues to operate, provided the throat area is kept cool.

The plunger creates the injection force by acting axially against the spline member which, in turn, forces the screw axially forward to impart pressures of injection magnitude to the material, and the material is thereby forced out of the discharge opening. When the nose of the screw is at the extreme position of movement in the direction of the end structure, the injection stroke is completed and the application of axial force in this first or forward direction by the plunger is terminated by an appropriate control means to be described hereinafter.

At approximately the same time, a spline drive means which is connected by a sprocket or other suitable means to an external drive source such as a gear reduction unit or hydraulic motor begins to impart rotation to the spline member and to transmit the rotational motion through the frangible link or a slip or overhead clutch to the screw.

As will be pointed out in greater detail hereinafter, the method and apparatus of this invention utilizes a constant speed motor, a synchronous motor for example, which is accurately timed to impart a given number of revolutions to the screw. As will also be discussed in more detail hereinafter, the use of an accurately timed constant speed motor and double acting piston eliminates and resistance to screw and piston return giving applicant's device a modus operandi entirely different than prior art devices.

The rotation of the screw then imparts a forward motion to the granular material which enters the helical passageway from the lateral passage and conveys it forward along the flights of the rotating screw until a substantial pressure in the bore and helical passage is created. As this pressure increases due to the continuing rotation of the screw and the resulting forward flow of the material as it melts, the plastic material in the helical passage and bore creates a reaction force on the nose of the screw in a direction away from the discharge opening.

Since the positive forward motion producing force on the plunger was terminated prior to rotation of the screw, the reaction force on the nose of the screw is transmitted from the screw to the adjacent end of the spline and thence toward the previously returned plunger to gradually return the screw to a rearward position as the plastic material adjacent the discharge end is continually increasing in density and quantity due to the rotation being imparted thereto. The rotation of the spline member, however, in spite of the spline's axial force transmitting relationship with the plunger during forward travel does not create a substantial rotation of the plunger at any time during the cycle because there is no positive rotational drive therebetween, and very little, if any, frictional rotational force is transmitted to the plunger because of the small area of contact between the members. In fact, the conventional two-way actuating means of the plunger is such that the plunger is generally free from rotation despite the rotation of the spline member.

It should again be noted that the rearward position of the plunger and screw is not controlled by limit switches or by the technique of regulating the resistance to screw return, as prevails in the prior art.

The plastic material enters the bore through the lateral passage in granular form and becomes plasticized, melted or fluidized under the influence of heat transmitted through the housing in a conventional manner from heating means such as electrical resistance heaters of the type conventionally used in the art.

As the material moves along the tortuous helical passage, it is stirred, mulled and compacted by the rotation, shearing and other movements imparted to it by the flights of the screw.

The prior art injection molding machines, whether of the plunger or screw type, have had serious shortcomings which the present segmented injection unit overcomes. Through the use of the segmented design, novel means of power transmission between the several segments of the unit are provided such that a substantially self-aligning device and more efficient method of plasticizing for injection molding has been made possible. This has been accomplished in such a manner that conventional standard plunger machines of the type now widely used in the industry may be converted to more efficient screw-ram operations without major alteration or expense, and as easily reconverted to plunger molding.

It will be recognized that a significant advantage of the segmented injection and plasticizing unit of this invention is that a separable means of driving the screw has been provided which minimizes heat transfer from the screw to the components of the drive unit and, therefore, permits much higher plasticizing temperatures as needed by modern heat-resistant thermoplastics to be used.

A further advantage which has been made possible by the novel slip or overload clutch or frangible link method of driving the screw element of the plasticizing unit is that the screw is self-aligned and comparatively free-floating within the housing bore and the problems of screw flexing and galling of the bore or screw flights is minimized in a manner not heretofore believed possible.

Also because of the separable connection feature of the segmented injection unit, it has been possible to protect the screw and the housing bore from damage due to tramp metal which is accidentally, from time to time, introduced into the injection machine by the use of contaminated plastic material. This is accomplished by the shear key slip or overload clutch which provides the rotational power link between the spline, or driving unit, and the screw, or driven unit, in a manner which will prevent damage to the expensive and accurately machined surface of the screw and bore.

A further advantage of providing the separable link type of connection of the segmented injection plasticizing unit is that by mere removal of the end structure of the housing means, it is possible to remove, inspect, and replace or clean the screw by merely pulling it axially away from the spline member. This is an important consideration in injection molding shops where a multitude of job order runs are performed and various color and material changes are constantly being made, and screw cleaning is frequently needed.

Another advantage of the segmented injection and plasticizing unit, as provided, is that the screw is rotated at relatively high speed and therefore may be made much shorter, which reduces its cost.

The feature of this invention which includes the segmented and separable injection and plasticizing unit is accomplished because of two particular features. First, there is no positively rigid axial connection between the screw and the spline and, accordingly, the screw neither transfers heat nor is integrally mounted to the drive unit. Thus, the entire apparatus may be quickly disassembled to remove the screw and/or the spline without disturbing the drive unit. Second, the simple manner of axial force transmission from the plunger to the spline without impartation of a positive rotational force of any appreciable magnitude to the plunger eliminates a multitude of costly precision alignment and seal problems common to other devices. The importance of these features, of course, is that they preserve the integrity and alignment of the unit without the necessity of complex and expensive radial and thrust bearings which are a primary source of failure in injection molding devices of the type currently being used.

It is an extremely important advantage of the instant invention that the comparatively high speed segmented injection and plasticizing unit inherently eliminates the extensive space requirements of prior machines by providing both a screw feed and ram feed action within the confines of the same housing means, and in such a manner that both on the forward stroke and at the end of the return stroke of the reciprocation, the pressure being applied to the material within the tortuous passage and bore of the housing is of a magnitude which permits efficient densification and charging for injection purposes.

It is also an extremely important advantage of the segmented injection and plasticizing unit that it will substantially eliminate the majority of flexing, galling, bearing and other complex misalignment problems which result in damage to the expensive screw and bore surfaces and bearings of previous designs. Furthermore, additional protection of the screw and bore results from the use of the slip or overload clutch or frangible link or shear key which acts to minimize damage from any tramp metal which may be accidentally found in the plastic material being utilized by the injection unit.

Another significant feature of the method and apparatus of this invention resides in the fact that the period or time of rotation of the screw is precisely controlled by means of a precision timer which controls the operation of a constant speed motor used to drive the screw. In the method and apparatus of this invention the position or limits of travel of the screw are not determinative of the size of the charge or shot.

In the prior art, the screw is rigidly fastened to the ram or pushing means and accordingly experiences some resistance in returning to the retracted or charging position. In certain prior art devices, for example, the device shown in the Willert Patent No. 2,734,226, the rearward position of the screw and ram is controlled by regulating and finally arresting the oil flow out of the pusher piston. Other prior art devices control the position of the screw and ram by means of limit switches. Neither of these methods have been successful in controlling the size of the charge shot entering the apparatus.

The size and consistency of the shot which is forced into the die must be quite uniform in order to consistently produce products of uniform character. It should be pointed out that shot weight variation in the molded part is extremely costly since a large number of rejects are found and overweight parts waste costly material.

In the operation of injection molding devices of this prior art type the quantity of plastic to be forced into the mold is placed ahead of the screw by axially unscrewing the screw out of the plastic melt against the available back pressures provided by the pushing piston. As the screw continues to back, plasticizing efficiency necessarily falls off and the material being pushed ahead of the screw into the shot chamber will vary in density, temperature, viscosity and the amount of volatiles carried by it, despite the position of the screw being arrested at the same point at the end of each period of rotation.

Numerous drawbacks prevail in those prior art devices which attempt to regulate the size of a shot or charge by controlling the rearward position of the piston by means of limit switches set to stop the piston at a given point in its travel. These problems arise because the screw will often coast past this predetermined point under the momentum of its rotational and other inertial forces. Also, feed variations occur which are caused by the relative position of the various screw volutes when screw rotation is stopped by striking the limit switch. Feed variations in this type of mechanism are very often due to differences in bulk density or pellet size and by the relative heat settings used on the barrel. These factors cause a difference in resistance to screw rotation due to a variable viscosity of the melt in the screw barrel.

These prior art devices have all been attended with disadvantages, for one reason or another, in failing to accurately control the weight of the plastic introduced in successive shots. A variation in the weight of the shot produces parts varying in density, in crystalline structure, in strain or flow patterns and of varying dimensions. It is thought that one of the primary reasons that the prior art has experienced the foregoing difficulty is that the technology has been derived primarily from the continuously turning thermoplastic extrusion screws.

The method and apparatus of this invention completely eliminates the necessity for regulating back pressure or the use of limit switches to control the position of the screw and ram. The basic considerations of this invention reside in the fact that the screw is designed for only intermittent rotation and for intermittent reciprocation and accordingly differs entirely from screws adapted for ordinary continuous extrusion where the screw rotates continuously and where back pressures are deemed necessary.

This invention contemplates the use of a timed rotation period rather than rotation over a given stroke length against a given back pressure, or resistance to rearward screw travel, and resulting variations in effective net pressure, shot weight, etc.

It is also thought that the prior art has failed to assess correctly the influence of the air entrapped in the cold, incoming granules and the effect of the gases generated during the thermoplastic melting process.

This invention which uses a timed period of rotation for the screws also eliminates the variables introduced by entrapped air volatiles, etc.

By allowing the screw ram to position itself each cycle, trapped air and gas can now readily escape backward along the flights of the screw. Shear factors, stress in the hot melt and stored energy therein and in the drive mechanism all relax themselves to normal every cycle because no external resistance to screw retraction is offered. Accordingly, these factors do not have any effect on the quality or actual amount of melt generated by the screw during each timed period of rotation. It is found that by rotating the screw at a given speed for a given time, a given quantity of material is taken from the hopper into the screw chamber. The rearward position of the screw ram compensates for the aforementioned variables. The actual position of the screw ram itself, however, is not significant at this point so long as it has been rotated for the prescribed period at the prescribed rate to thereby feed the prescribed amount of material into the chamber.

It should be specifically noted that in the present invention the screw ram is allowed to find its own relative rearward position, and any variables in feed or forward position are easily compensated for by setting the precision timer in accordance with the desired rotational period. By allowing the screw ram to rotate for a given period at a given rate, a given quantity of plastic is taken in by the screw; and the axial position of the screw is varied depending upon the final position of the volutes at the beginning of the charge phase, the bulk factors of the cold granules, the compressability rate of the various material and the amount of gases and volatiles generated during the plastification of this material. Since the pressure of the axial injection stroke is constant, any variation in the initial bulk volume due to a variance in melt viscosity, amount of gases present or the position of the screw is uniformly overcome by the injection pressure building up on the molten plastic.

It is found that this technique of metering in a certain quantity of plastic by timed screw rotation, without regard to the physical characteristics or properties thereof and allowing the screw to be self-positioning as dictated by these characteristics, coupled with the constant high pressure in the injection stroke, results in a minimum variance in shot weight between successive shots.

To summarize the foregoing and accent the radical nature of this feature of the invention it should be pointed out that the prior art utilizes a variable time factor and fixed screw position in charging the machine with plastic. This variable time factor of the prior art amounts to initiating rotation of the screw by means of a limit switch when the ram is in the fully discharged position and rotating same under controlled back pressure and finally stopping rotation of the screw by means of a limit switch when the ram reaches a particular rearward position. In these prior art techniques the screw may turn for a longer or shorter time period each cycle depending upon the melt viscosity, heat settings, rotation speed, amount of gases and so forth. This variable time in the prior art occurs regardless of the fact that the screw is stopped at about the same position each cycle.

In contrast to the prior art it should be pointed out that applicant's invention uses the following four basic constants:

(1) Constant rotation period repeating each cycle;
(2) Constant injection pressure repeating each cycle;
(3) Constant heat setting under precision instrument control; and
(4) Constant screw speed repeating each cycle.

The utilization of these constants operates to alleviate the numerous variables which have led to the problems prevailing in the prior art.

While the three-piece, timed-rotation, floating screw described above may be used with a conventional sliding ring valve, it is preferred to use a new and novel simplified internal ball check shut-off with a center discharge opening of the screw ram. Before considering the new and novel center discharge ball check screw design, the problems of the prior art sliding ring valves will be discussed briefly.

In the conventional sliding sleeve ring valves a large surface area is exposed to the inside of the cylinder and thus galling and scoring is more prevalent in addition to extended contamination of the system when color changes are made. Additionally, the sliding ring type of valve is slow in shutting off in certain more viscous melts, thereby causing bleed-back and uneven shot weight, which in turn produces uneven net effective injection pressure inside the mold with the resulting uneven molded part dimensions and tolerances. The large sealing or seat area on the sliding ring valves is particularly troublesome in connection with tramp metal which occasionally finds its way into the apparatus. A metal chip or foreign particle adhering to any one of the sealing surfaces results in bleed-back and pressure losses.

Further, the sliding ring valve is relatively costly in that a three- or four-piece nozzle tip construction is required; namely, a tip, a ring valve, two valve seats and a screw for assembly of same.

Probably, one of the most significant limitations in the conventional sliding ring valve is that it leaves a dead or dormant zone at the end of the screw itself leaving a mass of stagnant plastic which is a source of contamination when color changes are made. It is apparent that a certain amount of the material clings to this dead space on the tip of the standard screws where no turbulence or flow pattern exists.

The applicant contemplates providing the apparatus of this invention, as well as prior art stationary and floating screws with a center discharge port. This center discharge port is provided with an internal ball check valve in the tip of the screw plunger when used for injection work. This center discharge technique blows off the material otherwise adhering to the screw tip in the area occupied by the discharge port itself as well as adjacent or adjoining areas due to a venturi action which cleans off the dead area surrounding the port.

When using a center discharge port on the reciprocating screw the lastflight of the screw threads can be terminated into a U-shaped pocket, or convergence, in communication with a passage at substantially right angles to the axis of the screw with the passage being in communication with the discharge port. This allows the elimination of all contamination and blending problems incident to screw flight termination in the prior art.

It has also been found that this ball check center discharge design is more responsive in providing effective seal than a sliding ring valve type as well as providing a more positive shut-off at a much reduced sealing area.

In addition to the foregoing operational advantages, the ball check valve is much more easily repaired and replaced than the sliding ring valve because it is only necessary to remove retaining pin and replace the ball and/or re-work the seat.

An additional feature which attends the use of this center discharge design is that it allows the addition of about one or more full screw flights without any increase in screw length. This is a significant factor inasmuch as these screws are rated in length to diameter ratios and one more flight can equal a ten percent (10%) increase in efficiency over competing designs of equivalent length. While the center discharge design allows the utilization of the ball check assembly it should also be recognized that the center discharge design per se has significant advantages over the prior art as is more particularly pointed out in applicant's co-pending application Ser. No. 284,243 mentioned supra.

With the problems of the prior art devices and the advantages of the instant device in mind, it is a general object of this invention to provide an improved segmented injection unit for use in plastic injection molding, which is adapted for use in converting conventional injection molding machines for more efficient injection molding.

It is a more specific object of the invention to provide an injection molding machine which will minimize space requirements and permit interchangeable screw and plunger injection molding operation.

It is a more specific object of the invention to provide a self-aligning separable or segmented injection molding machine which permits higher plasticizing temperature and eliminates or minimizes heat transfer to bearings or other components of the drive unit.

It is a further object of the invention to provide a segmented injection molding device which by means of a frangible link or slip or overload clutch is protected from serious damage due to the presence of tramp metal in the plastic material charge.

It is a further object of the invention to provide a segmented injection plasticizing unit which is easy to disassemble, inspect, clean, and inexpensive to replace.

It is still another object of the segmented injection plasticizing unit, which will substantially eliminate the majority of flexing, galling, and other complex misalignment problems which result in damage to expensive screw and bore surfaces and bearings.

It is still another object of the segmented injection plasticizing unit to provide a substantially free-floating and bearing-free movable screw so as to simplify construction and operation, reduce cost and minimize maintenance thereof.

Another object of this invention is to provide a method and apparatus for plasticizing granular plastic wherein the axial positions of the ram and screw do not determine the size of the charge or shot.

Another object of this invention is to provide a method and apparatus for plasticizing granular plastic wherein there is a minimum variance in charge or shot weight between successive shots or charges.

Another object of this invention is to provide a method and apparatus for plasticizing granular plastic which eliminates the variables of bulk density of the granular material, pellet or granule size, heat input, back pressure on the screw and ram, the amount of entrapped gases and volatiles and viscosity of the melt.

Another object of this invention is to provide a method and apparatus for plasticizing granular plastic wherein the screw is self-positioning without regard to limit switches.

Another object of this invention is to provide a method and apparatus for plasticizing granular plastic wherein the rearward position of the screw varies depending upon the characteristics of the plastic granules or pellets, the amount of entrapped air and volatiles present as well as other parameters.

Another object of this invention is to provide a method and apparatus for plasticizing granular plastic wherein the screw is rotated at a constant speed for a given time to determine the size of the shot or charge.

Another object of this invention is to provide a method and apparatus for plasticizing granular plastic wherein the screw is rotated for the same period each repeating cycle.

Another object of this invention is to provide a method and apparatus for plasticizing granular plastic wherein a constant injection pressure is repeated each cycle.

Another object of this invention is to provide a method and apparatus for plasticizing granular plastic wherein a constant melt temperature is used for each repeated cycle.

Another object of this invention is to provide an apparatus for plasticizing granular plastic which may be easily and substantially completely purged of plastic to allow change of colors without significant contamination.

Another object of this invention is to provide an injection molding machine with a screw-ram which produces a flow of plastic on a first-in-first-out basis.

Another object of this invention is to provide an apparatus for plasticizing granular plastic which minimizes bleed-back around the screw ram during the injection cycle.

Another object of this invention is to provide an injection-molding machine with a screw which eliminates dead zones or dormant regions of plastic at the termination of the screw flight and at the extremity of the screw thereby to permit easier and more positive purging of the systems and to facilitate color changes.

Another object of this invention is to provide an injection molding screw with a discharge port in the end thereof, in fluid communication with a passage leading to a convergence defined by the terminal portions of the screw flight walls.

Another object of this invention is to provide a screw-ram of an injection molding machine with a valve which has a low period of response to forward motion of the screw ram.

Another object of this invention is to provide an injection molding machine with a center discharge port having a ball check valve therein operable in combination with a valve seat.

A further object of this invention is to provide a screw-ram tip portion including in fluid communication a convergence defined by the termination of passage walls center discharge passage having a ball check valve therein adapted to be mounted on existing screws.

Other and more specific objects of the invention will be apparent from the detailed description to follow.

In the drawings:

FIG. 2 is an enlarged longitudinal cross-sectional view of the device illustrated in FIG. 1 when in the charging position.

FIG. 3 is a view similar to FIG. 2 during the final stage of injection, illustrating an alternative form of torque-transmitting connection between the drive means and the screw.

FIG. 4 is an enlarged view, partially broken away, of the screw-ram.

FIG. 5 is a cross-sectional view of the screw-ram taken along the line 5—5 of FIG. 4.

FIG. 6 is a cross-sectional view taken along the line 6—6 of FIG. 2.

FIG. 7 is a cross-sectional view taken along line 7—7 of FIG. 4.

Figure 1:
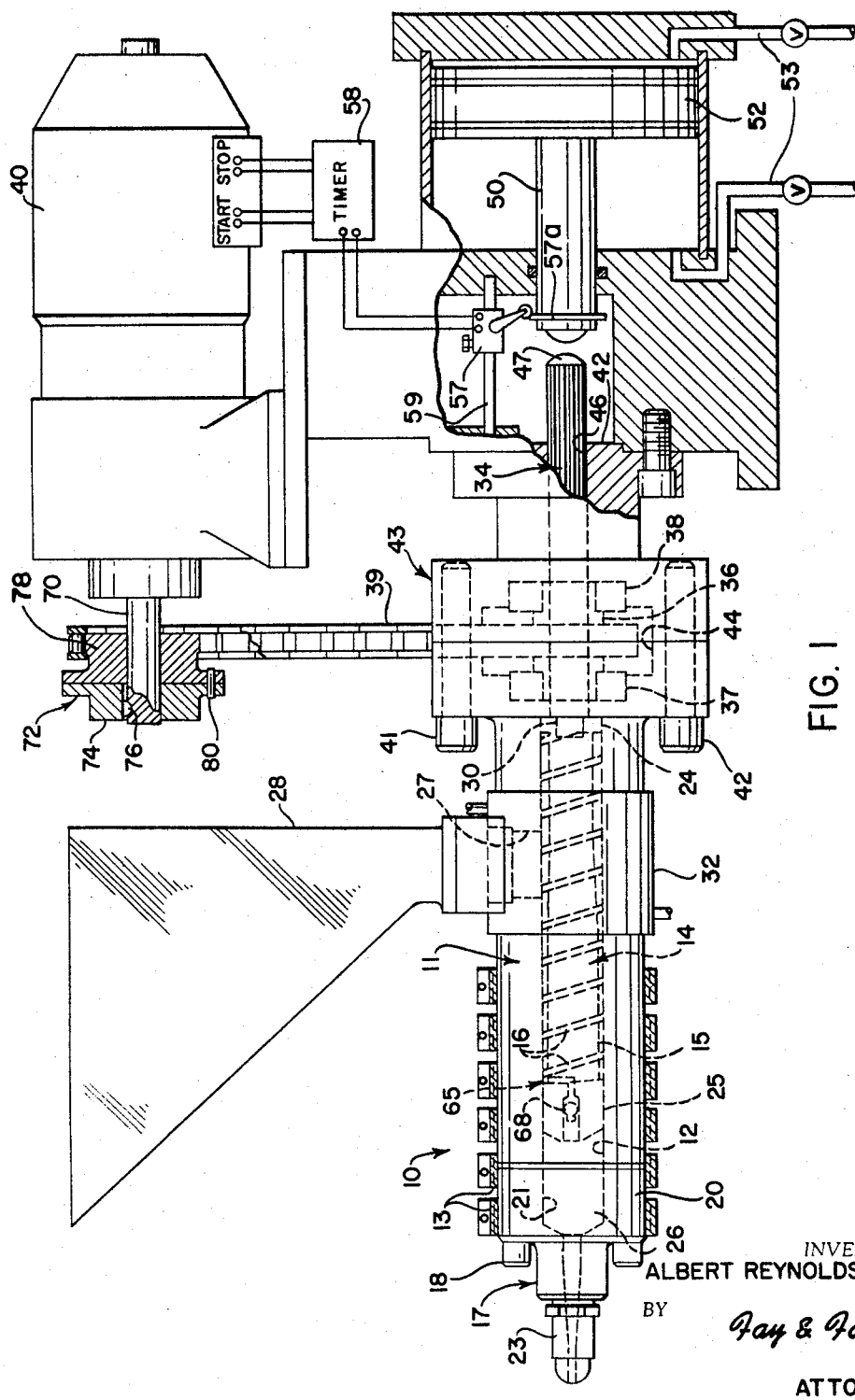
FIG. 1 is an elevational view of a segmented injection unit for use in plastic injection molding with a portion of the structure broken away for clarity.

In the several views of the drawings, like parts are designated by like numerals throughout. The segmented injection and plasticizing unit of this invention for use in either temporarily or permanently converting conventional injection molding machines for more efficient injection molding of thermoplastic materials is generally designated by the numeral 10 in FIG. 1.

The plasticizing cylinder assembly includes a heated, elongated metal barrel or housing means 11 of generally cylindrical shape having an axial bore 12 therethrough extending laterally from the material discharge end.

A plurality of electrical or other heating means 13 are provided around the periphery of the housing 11 in heat conducting relation thereto to provide heat for fluidizing the thermoplastic material. An elongated, intermittently rotating screw-ram 14, having a helical root groove 15 about the periphery thereof, is disposed in tight-fitting rotational relation with the bore 12 of the housing 11 throughout a portion of its length. The helical grooves 15 and the outer periphery of the member 14 are defined by flights 16 thereon.

Adjacent the discharge end of the elongated housing 11 is an end cap structure 17 which is secured by means of bolts 18 in face to face registered engagement with the end of the housing 11. Suitably tapped holes 19, as shown in FIGS. 2 and 3, for example, are provided in the housing to receive the shanks of the bolts 18 which pass through the flange portion 20 of the end structure. The end structure 17 has a central passageway 21 disposed therethrough in coaxial alignment with the bore 12. The exposed end of the passage 21 remote from the housing 11 has a counterbored and tapped portion 22 having threadedly secured therein a conventional mold nozzle 23 for connection to an injection mold or the like. The nozzle 23 may be of any one of a variety of forms well known to those skilled in the art such as, for example, a shut-off valve especially designed to prevent drooling. It is preferable to provide a slightly tapered section between the counterbored portion 22 and the portion of the passage 21 in register with the bore 12 to provide for smooth flow of the plasticized material into the nozzle.

At the end of the screw-ram, opposite the portion adjacent the discharge opening, and within the bore 12, a cylindrical shoulder or bearing portion 24 is provided of a diameter substantially the same as that of flights 16 but adapted rotationally to fit within the bore 12. At the end of the screw adjacent to the discharge opening, a cylindrical portion 25 having a tapered nose complementary to the tapered section between bore 12 and the end structure passageway 21 is provided. It will be seen that the cylindrical surfaces of the portions 24 and 25 of the member 14 assure that it is maintained in axial alignment within the bore 12 and passageway 21 at all times.

Referring now to FIG. 3, it will be seen that the screw ram 14 is of such a length relative to the bore 12 that the generally frusto conical nose of the cylindrical portion 25 of the screw-ram 14 never comes in contact with the end structure 17 to a degree which completely eliminates the presence of a cavity 26 adjacent the tapered section and accordingly provides for at least a small amount of plastic at the head of the portion 25 of the member 14. This insures that a supply of plastic for pushing on the nose 25 to retract the screw-ram 14 is always available. The plastic enters the flow path intermediate the ends of the bore 12 through a lateral passageway 27 which is connected to a suitable material reservoir 28 of conventional type.

The screw-ram 14 is rotationally driven in the embodiment illustrated in FIGS. 1 and 2 by means of a threaded connection 30 which joins the threaded portion of the screw-ram to the splined portion 34.

The connection may also be enhanced by the use of a weldment, in addition to the threads. The threads alone, or the threads as enhanced by the weldment, are selected in accordance with design and dimensional considerations so that a frangible or overload release connection is provided. Also, in certain larger models of the device a frangible block, received in opposed recesses in the screw portion and splined portion respectively, is used to provide the overload release feature and alleviate damage to the apparatus. The screw shown in FIG. 3 illustrates such a recess at 30 shown in dotted lines. A frangible block 33 shown in phantom is placed in these opposed recesses to transmit torque between respective members. It will be recognized by those skilled in the art that slip or overload clutches of various conventional forms may be utilized for the driving link between the spline member and the rotating screw member either instead of or in addition to the frangible link.

The spline member 34 is driven by a hollow sprocket or pulley hub member 36 having internal teeth of suitable dimension so that the spline member 34 may reciprocate through the central axial bore of said hub or sprocket while simultaneously being driven by the interengagement of the internal teeth thereof with the splines of member 34. Suitable bearings 37 and 38 are provided to insure a minimum amount of friction during rotation of the spline and sprocket or pulley members. The exterior of the pulley or sprocket member 36 is drivingly engaged by an endless belt or chain arrangement 39 which is connected to the drive shaft of a gear reduction unit driven by a constant speed drive means 40, such as a synchronous motor for example.

The entire housing structure 11 with the end structure 17 bolted thereto is integrally held to a housing means 43 by means of bolts 41 and 42. The housing means 43, with the flanged end of the housing structure 11, defines the bearing and pulley containing cavity 44 of appropriate dimension with an opening 45 through which the endless chain or belt 39 passes. The bearings 37 and 38 are, of course, mounted in counterbored recesses of a bore 46 which extend from the cavity 44. The bearings 37 and 38 are conventional ball or roller bearings and in this regard it should be emphasized that the elaborate thrust bearings of the prior art devices are not needed in applicant's apparatus.

The spline member 34 reciprocates within the bore 46 and the cavity 44. The forward movement of spline member 34 is in response to the forces exerted upon it by a plunger 50 of a conventional type of injection molding device. A novel connection is provided between these two members in the form of a rounded end 47 on the spline member 34 which permits almost a point contact with the end of the plunger 50 such that very little rotational bias occurs through the contact point while a positive axial force transmission may occur. The plunger 50 is provided with some type of conventional actuating means such as illustrated at 52 in the form of a hydraulic piston. Fluid pressure line connections 53 of a conventional type is normally present for actuation of the piston 52 to impart axial motion to the plunger 50. Actuation of plunger 50 is made in accordance with the dictates of control means, which actuate the hydraulic drive unit of the basic conventional injection ram machine upon which the segmented injection and plasticizing unit of this invention is mounted.

The drive unit 40 and plunger 50 of the segmented injection device are intermittently actuated and electrically interconnected with a precision timer 58 which alternately reciprocates plunger 50 and actuates the motor 40 to rotate the screw and drive it back by forcing plastic in front of it.

As the plunger 50 is brought to rest in its retracted position the precision timer 58 actuates the constant speed motor 40 and maintains same in operation for a precise number of seconds and then puts it out of operation. The screw finds its own axial position during this time interval since as the screw is rotated for a given number of seconds at a given rate it meters the granular plastic, or pellets, from the hopper and plasticizes it as it reaches the heaters and passes along the flow passage 15 of the screw toward the discharge end.

A suitable cooling means 32 is provided adjacent the area of the mouth 27 of the hopper 28 to insure that the granules or pellets do not reach the plastic state in this region. While no adiabatic heat is involved in the operation of the apparatus of this invention, a certain amount of heat is conducted from the region of the heaters 13 to the region of the mouth 27 and must be dissipated to alleviate clogging which will arrest proper feeding from the hopper.

As the plastic is caused to flow along the flow passage 15 it becomes completely plasticized and forms a relatively viscous melt. Continued rotation of the screw-ram moves the melt to the terminal portion of the flight walls of the passage 15 where it reaches a convergence of these walls which together with the area it encompasses is generally indicated by the numeral 65. A passage 66 provides fluid communication between the passage wall convergence or area 65 and the passage or cavity 21. In the embodiment illustrated, a ball check 68 is used to prevent back flow of melt on the injection stroke. The ball check 68 is retained in the passage by means of a pin 67.

Continued rotation of the screw-ram forces the melt into the convergence 65 and through passage 66, thereby forcing the ball check 68 into engagement with the retaining pin 67. The melt entering the cavity 21 ahead of the screw-ram forces the screw rearwardly. It is to be emphasized that rotation of the screw does not impart rotation to the plunger 50 since it has already returned to its original position and therefore the screw moves rearwardly without impedance or resistance. Inasmuch as no external resistance is offered to the return of the screw-ram it is unnecessary to provide a positive shut-off valve between the ram and mold. It is found that a small amount of plastic temporarily solidifies to an extent sufficient to seal the nozzle and prevent escape of the incoming material when the mold is open. The screw-ram continues to rotate and be forced rearwardly until the timer runs out, at which time it immediately stops.

Referring now to FIG. 2 it will be noted that the screw-ram may assume an infinite number of rearward positions. It must be recalled, however, that the screw-ram was rotated at a constant rate for a given number of seconds. The actual rearward position of the ram will be determined by the amount of entrained gases which were taken in with the plastic, the amount of volatiles present as well as many other variables. The actual position is not important, however, in that a uniform shot can be maintained by applicant's method and apparatus if the following operational characteristics are observed:

(1) Constant rotation period repeating each cycle;
(2) Constant injection pressure repeating each cycle;
(3) Constant heat setting under precision instrument control; and
(4) Constant screw speed repeating each cycle.

A typical sequence of operation which might be used with the illustrated embodiment, would be as follows.

The closing and locking of the mold connected to the end of the nozzle 23 in a conventional manner actuates control means which places piston 52 and plunger 50 into forward motion. The piston moves forward toward the discharge opening, pushing the spline member 34 forward; and the spline member 34, either directly or through the frangible link, pushes the screw ram forward. The spline and screw are not rotating during this state of the operation. The screw ram pushes the hot plastic out through the nozzle 23 and into a mold cavity with no substantial backward escape of material because of a ball check 68 located in the passage 66 connecting the helical portion of the flow passage 15 with the cavity 26 through the central portion of the screw nose 25.

The forward movement of the piston and screw-ram is controlled by suitable means, so that travel to the same forward position is realized each cycle and so that the piston rod or plunger 50 lightly strikes the rear face 42 of the housing 43 as illustrated in FIG. 3. The hydraulic control then returns the piston and plunger 50 to their orignal positions. This is done by a timer acting on hydraulic control system 53 in conventional manner.

The timer 58 then initiates rotation of the screw-ram by transmitting the proper signal to the constant speed motor 40. Through drive shaft 70, the drive sprocket generally indicated at 72, drive chain or belt 39 and the driven member 36, the screw-ram is thus caused to rotate. In operation the hydraulic control system 53 and timer 58 act to keep a gap between the spline and plunger 50.

As the screw-ram 14 turns it takes in material at throat 27 and forces it along helical passage 15, during which plastification occurs, and into the convergence 65 defined by the terminal portions of the flight walls. The melt leaves the area of the convergence 65 through passage 66 and passes around the ball check 68 into cavity 26. The pressure created in cavity 26 by the entering melt forces the screw-ram rearwardly until the timer runs out and arrests the rotation. As a safety feature in the event that the timer or other control means malfunctions, a shut-off switch or limit switch 57 may be tripped by a collar 57a on the plunger 50 to arrest the rotation and rearward travel of the ram to prevent damage to the machine. It is to be understood, however, that it is not the limit switch which arrests the rotation and rearward movement of the ram during normal operation. The limit switch 57 is mounted for adjustment on rod 59 and is actuated by collar 57a only in the event that the timer malfunctions or is improperly set.

The screw-ram drive means 72 also incorporates a yieldable or frangible pin which will shear to prevent damage to the apparatus. The drive means 72 includes a member 74 keyed to shaft 70 by means of a conventional key and keyway arrangement 76. Rotatably journaled on shaft 70 is a sprocket or pulley 78 which is caused to drive the chain or belt 39 by a shearpin 80.

Figure 8:
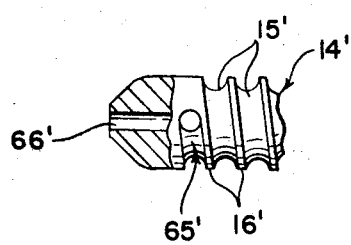
FIG. 8 is an enlarged view, partially in section and partially broken away, of a modified form of screw-ram showing the tortuous passage wall terminal portion convergence and center discharge passage in fluid communication.

It will be observed that FIG. 8 illustrates a fragmentary, detached exploded view of the center discharge feature utilizing the convergence 65' of the terminal portion of the walls of the flights 16'. It is preferred to use a ball check in the screw-ram for the reasons mentioned. However, if the screw-ram were long enough, the ball check could be eliminated. In the embodiment of FIG. 8 the screw 14' comprises a helical passage 15' defined by flight 16' and the wall of the chamber in which the screw-ram is operated. The melt passes along the passage 15' into the area of convergence 65' and out through passage 66'. It will be observed that by using the converging flight wall feature of this invention, the flow pattern of the material is well controlled. In essence the flow passage merely changes shape and direction but never ceases to define a continuous flow pattern and become a chamber containing a body of melt with some regions thereof being a part of the flow pattern and others being quasi-dormant. The flight wall convergence 65' acts as a transition zone where the melt from the flight is all collected, on a first-in-first-out basis, and channeled into the discharge. The flow passage comprises the helical passage 15', the flight wall defined convergence 65' and area encompassed thereby and discharge passage 66'. While the discharge passage is shown as comprising a portion which is disposed normally with respect to the axis of the screw-ram and a portion which is axially disposed to the screw-ram, it should be noted that the configuration or attitude of the passage 66' is not critical so long as it leads from the terminal portion of the helical passage 15' to the center of the terminal portion of the ram. Since the end of the bore 12 is similarly designed to the tip of the screw-ram, there is no possibility of dead zones existing in the cavity. The discharge of the melt through the center of the screw-ram alleviates the problems attending the use of the sliding ring type of valve and the attendant necessity of "feathering out of the last flight," whether desired or not.

It should also be observed that as the melt leaves the center of the screw-ram it creates an influence on that quantity of melt in proximity to the more radially distant points on the ram nose in the nature of a venturi effect. This center discharge technique alleviates the problem of dead zones in the apparatus as well as providing for a cylindrical bearing to prevent front end "wobble" of the screw from vibration and other forces acting along the length thereof.

Figure 9:
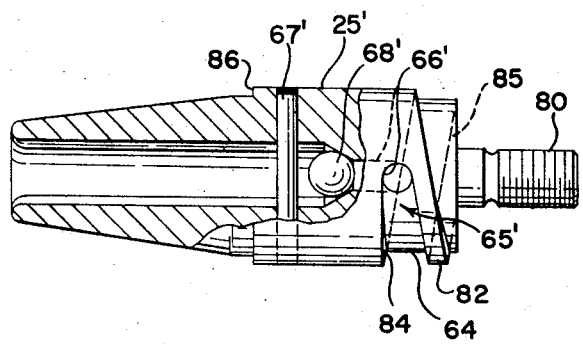
FIG. 9 is an elevational view, partially in section, showing a detachable tip incorporating certain features of this invention and adapted to be secured to existing screw-rams.
Figure 10:
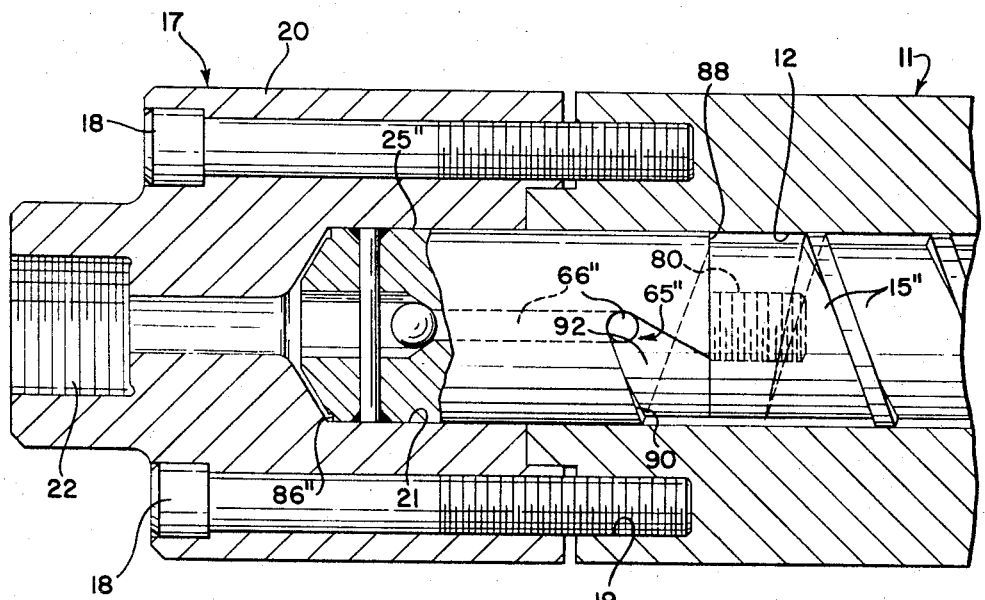
FIG. 10 is an elevational view, partially in section, showing a modified type of detachable tip portion with passage wall convergence and center discharge passage with ball check therein in fluid communication secured to a screw-ram illustrated in the extreme forward position.

FIGS. 9 and 10 illustrate how the features of the intercommunicated center discharge and convergence defined by the tortuous passage walls and the area encompassed thereby can be incorporated into existing screw-rams. The detachable tip of FIG. 9 includes a generally cylindrical midsection 25' which functions in the same manner and serves the same aligning function as does the generally cylindrical portion 25 of the ram illustrated in FIGS. 1 through 7. Integral with the detachable tip is a generally cylindrical coaxial threaded section 80 adapted to be received in a threaded bore of a screw-ram. Disposed between the cylindrical section 80 and the cylindrical section 25 is a portion of a flight 82. The wall of this partial flight 82, in combination with the wall 84 of the passage defines a short flow passage 64 which has wall portions which terminate at 65' in a convergence. The fractional flight feathers out radially at 85 into a diameter equivalent to the root diameter. This fractional flight which feathers out alleviates the problem of aligning the flight of the tip with the flight on the existing screw. While a partial flight is preferred from the standpoint of economy in manufacture, it should be understood that one or more full flights may also be used. The convergence at 65' leads to passage 66'. The detachable tip preferably includes a ball check 68' retained therein by retaining pin 67'.

The forward or terminal portion of the tip is tapered in a manner to be generally complementary to the tapered end portion of the bore 12 in the housing.

The detachable tip of FIG. 9 also includes a tramp metal trap indicated at 86. The tramp metal trap 86 amounts to a small, radially extending shoulder joining the surface between the forward end of the tip itself and the generally cylindrical portion 25'. This trap functions to arrest tramp metal in operation because it does not form a cooperative or complementary wedging surface with the tapered end of the bore 12.

FIG. 10 shows a detachable tip, of an alternative design, in assembled relationship on a screw and in an operational environment in an injection molding machine. It will be noted that the threaded section 80 is threadedly received in a threaded bore in the end of the screw. It will also be noted that this alternative design alleviates any necessity of providing any radial alignment between the screw-ram and the tip.

The tip illustrated in FIG. 10 comprises a generally cylindrical section 25" which serves a function similar to the corresponding portion of the tip of FIG. 9 and the generally cylindrical section 25 of the ram illustrated in FIGS. 1 to 7. The diameter of section 25" is selected to provide a sliding fit with the wall of the chamber and prevent bleed-back of the melt. When the tip is assembled on a screw-ram, a radially extending shoulder 88 is produced. The size of the shoulder is equal to the difference between the root diameter of the thread on the screw ram and the diameter of section 25".

The generally cylindrical section 25" is provided with a wall 90 which defines a convergently shaped recess 92 and intersects with the shoulder 88 at two points. A convergence 65" in communication with internal passage 66" is defined thereby at the inner terminus of the recess. As the screw rotates counterclockwise during the charging cycle, the melt leaves the tortuous passage 15", passes through the zone between shoulder 88 and the terminal portion of the screw fight, into the convergently shaped recess 92 and finally into the convergence 65" defined by wall 90 and leaves the screw-ram through passage 66".

The detachable tip of FIG. 10 is also provided with a circumferential groove or shoulder 86" serving as a tramp metal trap. In the environmental illustration of FIG. 10 it can be seen that the tapered nose on the tip does not provide a cooperative wedging surface with the end of the bore due to the existence of the groove or shoulder 86". The melt flows from the last flight of the screw into this flow passage and then is channeled into passage 66" by the rotational movement of the shoulder 90. It will also be noted that the groove 86" provides a small dead space in cooperation with the cavity end to entrap tramp metal.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting o fthe present invention, except as it is set forth and defined in the hereto appended claims.

The invention claimed is:

1. A device for use in injection molding of plastic materials comprising, an elongated housing means, heating means to provide heat to said housing means, a cylindrical bore in said housing means, a discharge opening at one end of said bore, a screw-ram mounted for rotary and reciprocatory movement within said bore and defining a tortuous passage in combination therewith, a lateral passage in said bore adapted to provide communication between a material source and said tortuous path, said tortuous passage being in communication with said lateral passage and said discharge opening, intermittently operable first drive means interconnected with said screw-ram to impart rotary movement thereto to produce a substantially constant number of revolutions of said screw ram for each successive period of operation, an intermittently actuated plunger means in axial force transmitting relationship during movement in the direction of said discharge opening with said screw-ram and means rotationally independent thereof to reciprocate the plunger independently of said first drive means.

2. The device of claim 1 wherein the walls of said screw-ram flights terminate in a convergence and said screw-ram is provided with a passage therethrough providing communication between said convergence and said discharge opening.

3. A device for use in injection molding of plastic materials comprising, an elongated housing means, heating means in heat transmitting engagement with said housing means, a cylindrical bore in said housing means, a discharge opening at one end of said bore, a self-aligning screw-ram mounted for rotary and reciprocatory movement within said bore, said screw-ram including a screw flight having walls which define a tortuous passage in combination with the wall of said bore, said screw-ram including spaced generally cylindrical portions disposed at opposite ends of the screw flight and in bearing engagement with said bore, an opening in said bore adapted to provide communication between a material source and said tortuous passage, said tortuous passage being in communication with said lateral passage and said discharge opening, intermittently operable constant speed drive means interconnected with said screw-ram in torque transmitting engagement therewith and slidable axially with respect thereto thereby to impart intermittent rotary movement to the screw-ram and permit axial movement thereof, control means including a timer interconnected with said drive means to produce a substantially constant number of revolutions of said screw-ram for each successive period of operation, second drive means to translate said screw-ram axially in said bore, said second drive means being independent of said screw-ram.

4. The device of claim 3 wherein said screw-ram flight walls terminate in a convergence and said screw-ram is provided with a passage therethrough providing communication between said convergence and said discharge opening.

5. The device of claim 4 which further includes a check valve in the passage providing communication between said convergence and said discharge opening within the screw-ram.

6. The device of claim 4 further characterized in that the convergence and the generally cylindrical portion on the terminal portion of the screw-ram are constructed as a unit and detachably secured to the screw-ram at the termination thereof.

References Cited

UNITED STATES PATENTS

| | | | |
|---|---|---|---|
| 3,146,287 | 8/1964 | Kleine-Albers | 18—30 |
| 3,163,693 | 12/1964 | Stenger | 18—30 |

FOREIGN PATENTS

| | | |
|---|---|---|
| 1,190,301 | 3/1959 | France. |

WILBUR L. McBAY, *Primary Examiner.*

U.S. Cl. X.R.

264—329